United States Patent [19]
De Marco et al.

[11] 3,719,053
[45] March 6, 1973

[54] LIQUEFACTION AND PURIFICATION SYSTEM

[75] Inventors: Salvador S. De Marco; Ernest A. Harper, Bartlesville, Okla.

[73] Assignee: Phillips Petroleum Company

[22] Filed: Oct. 23, 1969

[21] Appl. No.: 868,711

[52] U.S. Cl. ..........................62/38, 62/24, 62/28, 62/22, 62/26
[51] Int. Cl. ............F25j 3/00, F25j 3/02, F25j 3/08
[58] Field of Search............62/22, 23, 24, 27, 28, 40, 62/29, 31, 39, 38

[56] References Cited

UNITED STATES PATENTS

| | | | |
|---|---|---|---|
| 2,692,484 | 10/1954 | Etienne | 62/28 |
| 3,507,127 | 4/1970 | De Marco | 62/38 |
| 1,850,529 | 3/1932 | Bottoms | 62/27 |
| 2,940,271 | 6/1960 | Jackson | 62/27 |
| 3,306,057 | 2/1967 | Harmens | 62/40 |
| 3,407,614 | 10/1968 | Poska | 62/40 |
| 2,495,549 | 1/1950 | Roberts | 62/40 |
| 3,260,058 | 7/1966 | Ray | 62/23 |
| 3,596,473 | 8/1971 | Streich | 62/40 |

Primary Examiner—Norman Yudkoff
Assistant Examiner—Arthur F. Purcell
Attorney—Young and Quigg

[57] ABSTRACT

Helium is purified utilizing liquid nitrogen as the refrigerant, the resulting nitrogen vapors being mixed with impure nitrogen, compressed, cooled and purified. In the purification of the nitrogen by fractionation, the liquid bottoms product is cooled and utilized to condense the overhead vapors in the column. The column is of novel design having a system of liquid level controllers and a flow controller to effect the desired nitrogen purification in an efficient manner.

4 Claims, 1 Drawing Figure

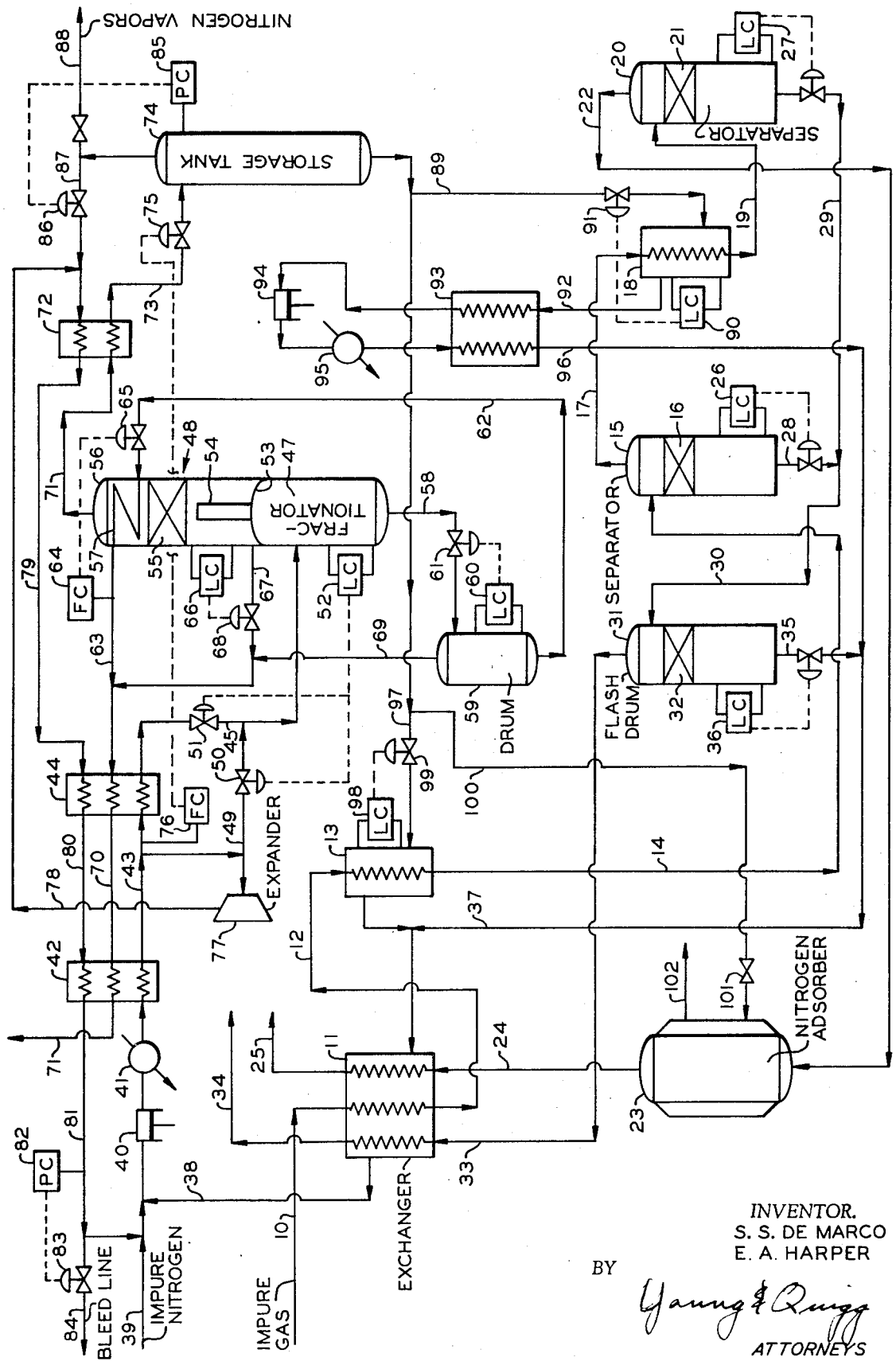

LIQUEFACTION AND PURIFICATION SYSTEM

BRIEF SUMMARY OF THE INVENTION

In the recovery of rare gases, such as helium, extremely low temperatures are employed, and elaborate systems of heat exchangers are utilized to make most efficient use of the refrigeration and thus conserve costs.

The final purification step for the recovery of helium involves separation of small quantities of nitrogen therefrom. The helium is cooled to the necessary low temperature by utilizing a refrigerant, such as pure liquid nitrogen. The nitrogen, in turn, is purified by the separation therefrom of small quantities of impurities such as methane.

Heretofore, the nitrogen purification column has utilized an indirect heat exchanger to condense the overhead vapors. A portion of the cold purified liquid nitrogen was flashed and passed through this coil. This stream was at a very low temperature, and was the main product of the separation.

We have discovered that the efficiency can be improved by utilizing a portion of the bottoms product from the nitrogen separation column for condensation of the overhead vapors. To this end, the bottoms product is flashed to provide a liquid fraction at a temperature sufficiently low to condense the overhead vapors. After passing through the condensing coil, the nitrogen is combined with the overhead from the flash drum, heat exchanged with the incoming impure nitrogen feed and recovered as an impure nitrogen product. The improved efficiency thus achieved can be advantageously utilized for low temperature separations other than the separation of methane from nitrogen.

Further in accordance with the invention, we utilize a fractionation column of novel construction and equipped with a novel control system for adequate regulation of the purification. Our novel fractionation system employs a kettle section having an overflow pipe at the top thereof. The condensed liquid in the feed to the kettle section is varied by a level controller, and the kettle product is withdrawn and passed through an expansion valve to a separation drum as regulated by a second level control unit.

The fractionation column has a packed section above the overflow pipe and a condenser section above the packed section. This contains a coil through which cold liquid is passed to condense a portion of the overhead product and provide reflux. The cold liquid product from the flash drum is passed through this coil at a rate determined by a flow controller at the coil outlet.

A liquid level controller near the upper portion of the overflow pipe controls the valve in a conduit leading from the column adjacent the lower end of the overflow pipe. This controller can be checked periodically to ensure that liquid is present in the overflow section of the column, and the level controller on the flash drum ensures that liquid is present at all times for condensing the overhead vapors.

Further in accordance with our invention, the nitrogen utilized to refrigerate the impure helium stream is passed in heat exchange relationship with the helium feed and sent to the nitrogen compressor of the nitrogen purification system where it is admixed with the impure nitrogen feed. Heretofore, the nitrogen vapors, after refrigerating the helium stream were admixed with the effluent from a turbo expander placed between the first and second heat exchange steps utilized to cool the incoming impure nitrogen. The turbo expander supplies cold nitrogen to condense the overhead product from the nitrogen purification column. We have discovered that variations in the rate of flow of nitrogen through the system can be effectively minimized by passing the nitrogen refrigerant to the compressor inlet.

DETAILED DESCRIPTION OF THE INVENTION

The invention will be more clearly understood from the following detailed description taken in conjunction with the appended drawing in which the FIGURE is a flow sheet of a liquefaction and purification system constructed in accordance with the invention.

HELIUM PURIFICATION

Referring now to the FIGURE, impure helium or other gas of low boiling point to be purified enters the system by a conduit 10. The gas contains an impurity to be separated which, in the example described, is approximately 20.2 percent nitrogen.

The helium is cooled in a heat exchanger 11 and thence passes through a conduit 12 to a second heat exchanger 13 wherein it is further cooled to a temperature low enough to partially condense the helium stream at the prevailing pressure. Thereupon, the cooled feed stream passes through a conduit 14 to a separation vessel or drum 15 having a packed section 16.

A purified helium stream passes overhead from the drum 15 and is transferred by a conduit 17, a vacuum heat exchanger 18, and a conduit 19 to a second separation vessel or drum 20 having a packed section 21. The helium is further cooled in the exchanger 18 so that all but traces of nitrogen are condensed and removed as bottoms in the drum 20, the purified helium stream passing overhead through a conduit 22 to a nitrogen adsorber 23. Here, the highly purified helium is contacted with activated charcoal to remove the last traces of impurity, the pure helium stream thence passing through a conduit 24 and the exchanger 11 to an outlet conduit 25.

The drums 15, 20 are provided, respectively, with liquid level controllers 26, 27 which actuate valves in the respective bottoms product conduits 28 and 29. The bottoms products from the drums, consisting of liquid nitrogen contains most of the nitrogen impurity but also containing some helium, are combined and pass through a conduit 30 to a drum 31 having a packed section 32. The overhead product, consisting of cold, gaseous helium and some nitrogen is passed through a conduit 33 and the exchanger 11 to an outlet conduit 34 from which an impure helium stream is recovered for subsequent treatment to recover the helium contained therein.

The bottoms product from the drum 31 consisting of liquid nitrogen with residual quantities of helium, is passed through a valved conduit 35, as regulated by a level controller 36, to a conduit 37. Thence, it passes as refrigerant through the shell of the exchanger 11 and a conduit 38 which joins a conduit 39 wherein impure nitrogen is introduced into the system.

As previously indicated, refrigeration of the helium stream is effected by nitrogen. In the broader aspects of the invention, however, any suitable refrigerant can be utilized which is capable of cooling the low boiling point feed gas to a temperature suitable for condensing and separating impurities therefrom by fractionation. In the system of the present invention, an impure nitrogen feed containing, for example, about 2 percent methane, is purified by removing the methane and cooled to liquid nitrogen temperature whereupon it can be utilized as refrigerant in the helium purification process thus far described.

The invention resides in the method of purifying the nitrogen stream wherein kettle product from the nitrogen fractionation column is utilized to condense reflux for the column, and in the control system utilized for this nitrogen fractionation column. In another aspect, the invention resides in the cooperation of the nitrogen refrigeration and purification steps with the helium purification system thus far described.

NITROGEN PURIFICATION

As stated, the impure nitrogen feed enters the system through the conduit 39 whence it passes through a compressor 40, a cooler 41, a heat exchanger 42, a conduit 43, a heat exchanger 44 and a conduit 45 to the kettle section 47 of a nitrogen fractionation column 48 of novel construction and function. The compressed nitrogen feed is cooled by the exchangers 42, 44 to a temperature below the boiling point of the methane impurity at the pressure prevailing in the column 48.

A portion of the partially cooled impure nitrogen stream bypasses the exchanger 44, passing through a conduit 49 under the control of a valve 50. The conduit 45 is provided with a valve 51, and both valves are actuated by a level controller 52 connected in the kettle section 47 below the feed inlet conduit 45. The controller 52 thus varies the feed temperature so as to maintain a desired level in the kettle section 47, and the valves 50, 51 are connected so as to maintain a required ratio between the quantity of feed bypassing the exchanger 44 and the quantity of feed passing therethrough. Preferably, the valve 51 is fully open and the valve 50 fully closed. Thereupon, if the level of the liquid in kettle section 47 becomes too high because of too much liquid in feed stream 45, controller 52 will partially open valve 50 thereby warming stream 45 and decreasing the liquid content.

The kettle section 47 has a closure plate 53 defining the upper end thereof, and pipe 54 protrudes upwardly from the closure plate.

The column 48 further comprises an intermediate packed section 55 and an upper condenser section 56 in which is disposed a cooling coil 57.

In the column 48, nitrogen containing the methane impurity is recovered as a bottoms product through a conduit 58 while the purified nitrogen goes overhead.

In accordance with the invention, the bottoms product is discharged from the conduit 58 and flashed into the upper portion of a drum 59. The rate of discharge is regulated by a level controller 60 in the lower portion of the drum 59, the controller actuating a valve 61 in the conduit 58. The valve 61 also functions as an expansion valve to cool the bottoms product to a temperature low enough to condense a portion of the vapors going overhead from the column 48.

The cooled liquid from the drum 59 passes through a conduit 62 to the coil 57 which discharges it into an outlet conduit 63. A flow controller 64 in the conduit 63 regulates a valve 65 in the conduit 62 so as to maintain a constant rate of flow through the coil 57.

The indirect heat exchange between the liquid in the coil 57 and the nitrogen vapors in the overhead section 56 condenses a portion of the overhead vapors which pass downwardly through the packed section 55 as reflux. The described use of cooled bottoms product as a condensing medium conserves a substantial quantity of refrigeration, compared to the prior practice of utilizing the extremely cold liquid nitrogen product to cool the reflux section of the column.

It is a feature of the invention that a level controller 66 is connected to the column 48 at a position slightly below the top of the pipe 54. Liquid is discharged from this section through a conduit 67 under the control of a valve 68 which is actuated by the level unit 66 to maintain a predetermined liquid level in the intermediate portion of the column 48. When the controller indicates that liquid is present, it is known that the column is being properly refluxed by condensed nitrogen flowing downwardly through the packed section 55 into the region surrounding the pipe 54. Conversely, if no liquid level is indicated by the controller 66, there is inadequate reflux, and the system is adjusted, as by regulating the flow controller 64, to increase the supply of cooling liquid to the coil 57 and condense more reflux material.

The nitrogen vapors containing methane impurity are recovered from the top of the drum 59 by a conduit 69. These cold, impure vapors are combined with the material discharged through the conduits 63 and 67 and passed as refrigerant through the exchanger 44, a conduit 70, and the exchanger 42 to a discharge conduit 71 for the recovery of the impure nitrogen stream. Thus, the cold vapors are utilized to cool the incoming impure nitrogen feed stream.

The overhead vapors from the column 48, consisting of pure nitrogen, are discharged through an overhead conduit 71 and thence traverse an exchanger 72 and conduit 73 which discharges into a storage drum 74. In the exchanger 72, the vapors are cooled sufficiently that the nitrogen is liquefied. It is then flashed into the drum 74.

A valve 75 in the conduit 73 is regulated by a flow controller 76 to maintain a desired flow in the overhead section 56.

The cooling effected in the exchanger 72 is provided by a stream of cold nitrogen vapors. To this end, a portion of the partially cooled impure nitrogen feed from the conduit 43 is passed through a turbo expander 77, the cold vapors thence passing through a conduit 78, the exchanger 72, a conduit 79, the exchanger 44, a conduit 80, the exchanger 42 and a conduit 81 which recycles the vapors to the inlet of the compressor 40. The vapors thus condense the pure nitrogen in the exchanger 72 and assist in cooling the incoming impure nitrogen feed in the exchangers 42 and 44.

A desired pressure is maintained in the conduit 81 by a pressure controller 82 actuating a valve 83 in a bleed line 84. Similarly, a desired pressure is maintained in the storage drum 74 by a pressure controller 85 controlling a valve 86 in a conduit 87 leading from the top of the storage drum to the conduit 78. Pure nitrogen vapors may be recovered from the system by a valved line 88.

REFRIGERATION

As previously stated, the pure liquid nitrogen from the drum 74 is utilized as refrigerant in the described helium purification system. To this end, a first portion of the liquid nitrogen is passed through a conduit 89 to the shell of the exchanger 18 wherein it boils at reduced pressure and temperature, the quantity being regulated by a level controller 90 regulating a flash valve 91. The boiling nitrogen cools the partially purified helium stream passing through the conduit 19 to such a temperature that all but traces of nitrogen impurity are condensed and removed in the column 20.

Refrigerant vapors pass from the exchanger 18 through a conduit 92, a set of tubes in a heat exchanger 93, a compressor 94, a cooler 95, another set of tubes in the exchanger 93 and a conduit 96. The vapor joins that in the conduit 35 so the compressed cooled vapors enter the shell of the exchanger 11 and thence are discharged through the conduit 38 to the inlet of the compressor 40. Thus, the cooled compressed vapors in the conduit 96 are utilized to cool the incoming impure helium stream in the exchanger 11, and the system pulls a vacuum on the boiling nitrogen in exchanger 18, thereby lowering the temperature of the nitrogen refrigerant.

Another portion of the liquid nitrogen refrigerant is discharged from the drum 74 through a conduit 97 into the shell of the exchanger 13, the quantity being regulated by a level controller 98 actuating a valve 99. In this fashion, the partially cooled impure helium stream from the exchanger 11 is cooled to a temperature below the boiling point of the nitrogen impurity at the prevailing pressure so that the bulk of the thus-condensed nitrogen can be separated therefrom in the column 15. Vapors from the exchanger 13 pass to the shell of the exchanger 11 and thence through the conduit 38 to the inlet of the compressor 40, thus assisting in the initial cooling of the impure helium stream in the exchanger 11.

A third portion of the liquid nitrogen refrigerant is discharged through the conduit 97 and a conduit 100 to the shell of the nitrogen adsorber 23, where it cools the adsorbent to a sufficient low temperature to effect efficient adsorption of the last trace of nitrogen from the purified helium stream. The amount of refrigerant thus utilized is controlled by a valve 101 and the used refrigerant is discharged through a conduit 102.

It will be noted that the two streams of refrigerant vapors passing through the exchanger 11 are returned to the inlet of the compressor 40, these two streams being employed to cool the helium stream in the exchanger 13 and the helium stream in the exchanger 18. Heretofore, the used refrigerant stream, i.e., that passing through the conduit 38, was returned to the outlet of the turbo expander 77 and refrigeration gained therefrom was used to condense the stream passing through the conduit 73. This caused variations in flow through the conduit 78 and exchanger 72, making it quite difficult to adequately control the temperatures at this point in the system. We have discovered that these problems are obviated by returning the refrigerant vapors from the conduit 38 to the inlet of the compressor 40.

As previously noted, better utilization of the refrigeration capacity of the system and more efficient operation are obtained by utilizing cooled bottoms product from the column 48 to condense vapors in the overhead section 56 and provide reflux for the nitrogen purification column. The control system associated with the column also aids importantly in effecting efficient purification and smooth operation of the column 48. Thus, a supply of the proper quantity of feed at the desired temperature is provided by operation of the controller 76 operating valve 75, and in conjunction with controller 52 operating the valves 50 and 51. Flow is controlled by valve 75 and a desired liquid level is maintained in the kettle section 47, by adjusting the amount of material bypassing the exchanger 44, this being effected by adjusting the valves 50 and 51.

The level controller 60 ensures that cold bottoms product from the kettle section 47 is always available to provide proper cooling in the coil 57, thus properly refluxing the column. Further control over the reflux is effected by the flow controller 64 and the resulting actuation of the valve 65.

Finally, the provision of the pipe 54 together with the level controller 66 and valve 68 enables the operator to determine at a glance that the column is being adequately refluxed, this being indicated by the presence of a liquid level in the section of the column above the closure plate 53.

OPERATION

As indicated, our invention has utility in separating and purifying gases of low boiling point utilizing as refrigerant a low boiling point material which must be purified to obtain the proper refrigeration temperature. Also, the column 48 is novel both in itself and in combination with the control system employed therewith. It has utility, therefore, in making a variety of separations.

The operation will, however, be described in connection with the purification of a helium stream containing 20.2 weight percent nitrogen as an impurity, the refrigerant being nitrogen containing about 2 weight percent methane as an impurity. The methane is removed to provide pure liquid nitrogen as refrigerant. It will be understood that the temperatures, pressures, flow rates and other variables indicated are typical and thus describe only one specific embodiment of our liquefaction and purification system.

Helium feed enters the system at 2,760 psig and 90° F. at a flow rate of 1,352 MCFD. It is cooled to a temperature of −304° F. in the exchanger 11 and to a temperature of −315° F. in the exchanger 13, entering the separator 15 at a pressure of 2,720 psig. The purified gaseous helium passing through the conduit 17 is cooled to a temperature of −341° F. in the exchanger 18 and enters the separator 20 at a pressure of 2,713 psig. The additionally purified gaseous helium leaving the separator 20 through the conduit 22 enters the adsorber 23 at a temperature of −341° F., 2,712 psig and a flow rate of 1,079 MCFD. The pure helium is discharged through the conduit 24 at a temperature of −320° F. and passes to the exchanger 11 wherefrom it is discharged at room temperature.

Liquid nitrogen refrigerant is discharged from the storage drum 74 at a temperature of −307° F., a pressure of 25 psig being maintained in this vessel. The portion passing through the conduit 89, after flashing through valve 91, is at a temperature of −342° F., the stream consisting of 52 pounds per hour of vapor and 248 pounds per hour of liquid. The vapors are discharged through the conduit 92 at a rate of 98 MCFD and a flow rate of 300 pounds per hour. They enter the exchanger 93 at −337° F. and are discharged at 80° F. Thereupon, the vapors are compressed and enter the exchanger 93 at a temperature of 90° F., leaving at a temperature of −310° F. They enter the exchanger 11 at a temperature of −313° F.

The portion of the liquid nitrogen refrigerant traversing the conduit 97 by virtue of flash valve 99 enters the exchanger 13 at a temperature of −320° F., there being 13 pounds per hour of vapor and 157 pounds per hour of liquid. The vapors discharged from the exchanger 13 are combined with those flowing through the conduit 37, the total flow to the exchanger 11 being 89 MCFD vapors and 3,089 gallons per day of liquid at a temperature of −313° F.

A third portion of liquid refrigerant is discharged from flash valve 101 into the nitrogen adsorber 23 at a rate of 80 pounds per hour of vapor and 380 pounds per hour of liquid.

170 gallons per day of liquid is discharged from the separator 20 through the conduit 29 and this joins 2,764 gallons per day of liquid from the bottom of the separator 15, these streams being at temperatures of −341° F. and −318° F., respectively. The combined streams enter the drum 31 whence 5.5 MCFD of vapors are withdrawn at a temperature of −319.2° F. and raised to room temperature upon passing through the exchanger 11. As previously indicated, the bottoms product of the drum 31 passes to the shell of the exchanger 11 in conjunction with vapors from the exchanger 13 and the conduit 96, the combined stream entering the exchanger 11 at −313° F. and exiting from the exchanger at room temperature.

The nitrogen feed stream to the compressor 40 comprises 8,555 MCFD or 26,219 pounds per hour and enters the exchanger 42 at a temperature of 90° and a pressure of 315 psia. It is cooled to a temperature of −200° F. in the exchanger 42 and to a temperature of −248° F. in the exchanger 44. The valve 51 is normally open and the valve 50 is normally closed. Under these conditions all of the feed flows through the conduit 45 to the kettle section 47 which is maintained at a temperature of −248.3° F. and a pressure of 305 psia. Should the liquid level in the kettle rise above that set by the controller 52, the valve 50 is opened to bypass a portion of the feed around the exchanger 44 and thus increase the feed temperature with a resultant decrease in liquid content. The amount of bypassed material varies up to 260 MCFD maximum. Kettle product withdrawn from the column 48 is cooled by flashing through the valve 61 and enters the drum 59 at a temperature of −298° F., a pressure of 50 psia and a flow rate of 48 MCFD vapor and 857 gallons per day liquid. This amount of liquid normally flows through the conduit 62, entering the coil 57 at a temperature of −301° F. and a pressure of 40 psia, and leaving the coil at a temperature of −295° F. In this fashion, adequate refluxing of the fractionation column is obtained, it being understood however that minor variations in flow rate may occur through actuation of the controller 64.

The material passing through the conduit 63 is combined with 48 MCFD of gas from the flash drum 59 and 33 MCFD gas and 537 gallons per day of liquid flowing through the conduit 67. The combined streams enter the exchanger 44 at a temperature of −301° F. and a pressure of 39 psia. This stream is warmed to a temperature of −267° F. in the exchanger 44 and to room temperature in the exchanger 42. 614 pounds per hour is discharged through the conduit 71.

The overhead product of the column 48, consisting of nitrogen of 99.5 percent purity, leaves the column at a temperature of −251° F. and a pressure of 305 psia. It passes at the rate of 924 MCFD through the exchanger 72 wherein it is condensed and cooled to a temperature of −297° F. and, thence, to a temperature of −307° F. by expansion through the valve 75.

The stream fed to the expander 77 enters at −200° F. and 310 psia. 7,423 MCFD of gas is discharged at a temperature of −307° F. and a pressure of 25 psia. In the exchanger 72 it is warmed to a temperature of −276° F., 7,500 MCFD or 23,060 pounds per hour being passed to the exchanger 44 where it is warmed to a temperature of 267° F. and thence through the exchanger 42 where it is warmed to room temperature.

In this fashion, helium of extremely high purity is produced from the 79.8 percent pure helium fed to the system, and the nitrogen feed stream is effectively purified of its 2 percent methane content. Without continuous removal of the methane from the nitrogen refrigerant, the methane content would increase, thus increasing the boiling point of the nitrogen and reducing its effectiveness as a refrigerant.

We claim:

1. The method of purifying a gas feed stream of low boiling point containing a small quantity of impurity which comprises cooling said stream to a temperature low enough to condense said impurity at the prevailing pressure and to separate the feed stream into a liquid bottoms product and a vaporous overhead product of a fractionation zone, flashing the bottoms product to produce a liquid of lower temperature than said bottoms product and a flashed vapor, separating the liquid of lower temperature and flashed vapor, passing the liquid of lower temperature in indirect heat exchange relation with said vaporous overhead product to cool the overhead product and condense a portion thereof, returning the condensed portion to the fractionation zone as reflux, combining said liquid from the indirect heat exchange step with the flashed vapor and passing the combined stream in heat exchange relation with the feed stream, and recovering the remainder of said overhead product as a purified gas stream.

2. The method of claim 1 wherein the gas stream is nitrogen containing a small quantity of methane.

3. In the method of claim 2, cooling the purified gas stream, and recovering the resultant liquid nitrogen.

4. A process for the purification a feed gas of low boiling point containing quantities of an impurity which comprises the steps of 1. cooling the feed gas in an indirect heat exchange step to a temperature low enough to condense said impurity at the prevailing pressure, 2. separating a purified gas fraction from the condensed impurity,
3. vaporizing a liquid refrigerant stream of said impurity to cool the feed gas in said indirect heat exchange step (1),
4. mixing the heat exchanged stream of said impurity with an impure feed stream of said impurity,
5. compressing the mixed stream,
6. cooling the mixed stream to a temperature low enough to condense the impurity present in the mixed stream at the prevailing pressure,
7. separating in a fractionation zone the cooled mixed stream to provide a liquid bottoms product and a vaporous overhead product,
8. flashing the bottoms product to produce a liquid of lower temperature than said bottoms product and a flashed vapor,
9. separating the liquid of lower temperature and the flashed vapor,
10. passing the liquid of lower temperature in indirect heat-exchange relation with said vaporous overhead product to cool the overhead product and condense a portion thereof,
11. returning the condensed portion to the fractionation zone as reflux,
12. combining said liquid from the indirect heating step (10) with the flash vapor from step (8) and passing the combined stream in heat exchange relation with mixed stream of step (6), and
13. recovering the remainder of said overhead product as a purified refrigerant for use in step (3).

* * * * *